United States Patent [19]

Casabonne et al.

[11] Patent Number: 5,503,671
[45] Date of Patent: Apr. 2, 1996

[54] HIGH TEMPERATURE RETARDERS FOR OIL FIELD CEMENTS, CEMENT SLURRIES AND CORRESPONDING CEMENTING PROCESSES

[75] Inventors: Jean-Michel Casabonne, St. Rambert; Marc Jouve, Saint-Etienne, both of France; Erik Nelson, Broken Arrow, Okla.

[73] Assignee: Dowell, a divison of Schlumberger Technology Corporation, Houston, Tex.

[21] Appl. No.: 438,673

[22] Filed: May 10, 1995

Related U.S. Application Data

[63] Continuation of Ser. No. 207,994, Mar. 8, 1994, abandoned.

[30] Foreign Application Priority Data

Mar. 10, 1993 [FR] France ................................ 93 02834

[51] Int. Cl.[6] .................................................. C04B 24/00
[52] U.S. Cl. ........................ 106/717; 106/724; 106/819; 106/823; 523/130
[58] Field of Search ............................. 523/130; 106/724, 106/819, 823, 717, 727, 696, 802; 166/292, 293; 405/266, 267

[56] References Cited

U.S. PATENT DOCUMENTS

| | | | |
|---|---|---|---|
| 3,346,488 | 10/1967 | Lyons et al. | |
| 3,483,007 | 12/1969 | Hook. | |
| 3,748,159 | 7/1973 | George. | |
| 4,466,836 | 8/1984 | Crump et al. | |
| 4,470,463 | 9/1984 | Holland | 166/293 |
| 4,941,536 | 7/1990 | Brothers et al. | 166/293 |
| 4,997,487 | 3/1991 | Vinson et al. | 106/804 |

FOREIGN PATENT DOCUMENTS

| | | |
|---|---|---|
| 0177308 | 10/1987 | European Pat. Off. . |
| 2157279 | 10/1985 | United Kingdom . |

*Primary Examiner*—Paul Marcantoni
*Attorney, Agent, or Firm*—John E. Vick, Jr.

[57] ABSTRACT

The invention relates to the cementing of high temperature wells. A cement retarder comprises a phosphonic acid derivative combined with borax in a weight ratio of phosphonic acid derivative to borax of about 0.025 to about 0.2. A long pumping time is realized with rapid compressive strength development following placement.

5 Claims, No Drawings

HIGH TEMPERATURE RETARDERS FOR OIL FIELD CEMENTS, CEMENT SLURRIES AND CORRESPONDING CEMENTING PROCESSES

This application is a continuation of 08/207,994, filed Mar. 8/1994, now abandoned.

The invention relates to the technical sector concerned with the cementing of the annuluses of oil, gas, water, geothermal and analogous wells.

The man of the art is familiar with the need, after a well has been drilled, to inject a cement slurry into the annulus located between the tubing and the underground formations, both to consolidate the well and to insulate the different zones.

The process consists in injecting the slurry into the tubing right down to the bottomhole, and then in causing it to rise up through the annulus, where it is allowed to set. The general process is well known, and there is no need to explain it in detail here.

We are also familiar with the difficulties experienced by the operator, particularly on account of the temperature cycle undergone by the cement slurry.

This problem is particularly acute in the case of wells in which the slurry will be subjected to high temperatures.

In this case, it is particularly difficult to reconcile two vital requirements, one being to retard the setting of the cement sufficiently (and despite the fact that the slurry goes through a high temperature stage) for setting actually to take place in the annulus, and the other requirement being not to prolong unduly, through the effect of the necessary retarder, the time that the cement slurry, and in particular that portion of it which is located towards the top of the well, that is to say at a fairly low temperature, will take to set to a sufficient degree.

In the case of deep wells, that is to say one of the examples of high temperature wells, the problem is aggravated by the fact that the slurry pumping time is longer. The slurry is thus subjected to shear stresses, the prolongation of which further lengthens the time taken for the cement to set after its placement.

The solutions proposed in the prior art are either inadequate or very imperfect, or unsatisfactory.

According to U.S. Pat. Nos. 4,941,536 and 5,049,288, a borate is mixed with water soluble copolymer. In the examples given, these patents do not make it possible to obtain both a long thickening time (TT), that is to say of more than 7 hours at the bottom hole circulation temperature (BHCT), and swift compressive strength development for the cement after its placement for temperature below the BHCT, the criterion in this connection being that of attaining 35 kg/cm$^2$ (500 psi) in less than 24 hours at a temperature 50° F. below the BHCT (or approximately BHCT less 30° C.)

These two criteria are those that are generally recognized in the oil industry.

It is also known to use organophosphates for their deflocculating and sequestering properties (U.S. Pat. Nos. 3,346,488 and 5,089,150), as well as their stability, and to use them as dispersants (American patent application Ser. No. 487,469 of Feb. 3/1990) or setting retarders (Ser. No. 665,248 and GB 84-09517).

However, with higher phosphonate contents, the advantageous property of swift compressive strength development is not obtained.

In U.S. patent application Ser. No. 665,248, it is essential to add a set activating agent in order to obtain appropriate development of the gel structure, to prevent sedimentation and free water phenomenon. This activating agent is a CMC or HECMC (well known cellulose derivatives), or an AMPS.

Document GB 84-09517 (GB 2,157,279, Nelson) does not suggest simultaneous achievement of the two aforementioned conflicting properties either. In this respect, example 5 does not specify the value to which "sufficient strength" corresponds. This document describes certain associations of phosphonic derivatives and borax (examples 4 and 5) over a wide range of proportions. In these associations, the borax plays the part of a retarder aid and is not the active retarding agent.

U.S. Pat. Nos. 3,748,159 and 4,997,487, as well as document SPE/IADC 21976, will also be cited.

The present invention makes it possible, for the first time, to obtain simultaneously a very long setting time and very swift compressive strength development as soon as the cement slurry is placed in the annulus and pumping has stopped.

According to the invention, there is proposed a combination having a retarding effect for oil field cement slurries and analogous substances, consisting of a methylene-phosphonic acid derivative and borax (decahydrated sodium tetraborate, corresponding to the formula $Na_2B_4O_7.10H_2O$).

It has been discovered that, by selecting the ratio of the two components, in a narrow range, and by selecting the phosphonic derivative from an equally restricted family, the two properties mentioned above are surprisingly obtained simultaneously and very distinctly, namely a very long setting time, even at high temperatures, making it possible to cement deep, geothermal and analogous wells with the vital security margin (precluding any risk of premature setting inside the tubing, or "flash set"), and very swift compressive strength development, up to high values, when the slurry has been placed, thus guaranteeing cementing quality and considerably shortening the time for which the well is unproductive, which is a very important economic factor.

As mentioned earlier, the selection according to the invention concerns the choice of phosphonic compound.

Whereas very broad families of phosphonic derivatives are described in the prior art, only three compounds can be used to obtain the dual property described above, There are:

the compound referenced "E" on page 3 of the GB patent 2,157,279 aforementioned, namely the calcium salt of phosphonic ethylenediamine-N,N,N',N'-tetrakis (methylene) acid with seven calcium equivalents (3.5 moles);

the compound referenced "D" in the same document, namely the heptasodic salt of the same phosphonic derivative;

the compound referenced "H" in the same document, namely phosphonic N,N,N',N", N"-penta(methylene) acid.

As we shall see below, compound "E" yields by very far the best results. In the aforementioned GB patent 2,157,279, the combination of E+ borax is given as an example, but in a weight ratio of ⅔(example 5). According to the invention, the range of ratios used is very far removed from this example.

In addition, it would seem to us, without wishing to be tied down to a theory, that the selection according to the invention is accompanied by a reversal of the functions.

In the prior art, the phosphonic derivative is the retarder, and the borax or the borate is simply an adjuvant or retarder aid.

According to the invention, the borax is the main retarder, while the phosphonic derivative plays the part of an aid, with a synergy that provides the dual property mentioned earlier.

The second selection parameter according to the invention is the choice of the phosphonic derivative/borax weight ratio, which has to be as follows: phosphonic derivative/borax=0.025 to 0.2.

The preferred ratio for phosphonic derivative "E" is:

"E"=5/borax=90, that is to say an E/borax ratio of 0.055 (by weight).

The present invention makes it possible to cement high temperature wells (at typically 120° to 260° C., i.e. 250° to 500° F., in the case of the static temperature at the well bottom), with a long pumping time that is made possible with complete security thanks to a thickeningtime (TT) of over 7 hours at the BHCT, and with swift compressive strength development after placement, reaching 35 kg/cm2 (500 psi) in less than 24 hours at the BHCT less 50° F. (i.e. BHCT less approximately 30° C.).

The retarding composition (phosphonic derivative+borax) will be present in a proportion of 0.1 to 10% by weight of cement ("BWOC").

Phosphonic derivatives E, D and, H as well, of course, as borax, are commercially available. The following examples illustrate the invention without, however, limiting its scope.

In these examples, the meanings of the abbreviations are as follows:

%BWOC: % by weight of cement
TT: thickening time
CS: compressive strength
BHCT: bottom hole circulation temperature
Ph: phosphonic acid derivative "E"
B: borax
BHST: bottom hole static temperature Retarding mixture: Ph+B
ST: static temperature (measurement of CS)
BWOW: by weight of water The CS measurements were conducted using a Halliburton ultrasonic analyser ("UCA"). This is a non-API (American Petroleum Institute) technique, but one that enables the 35 kg/cm2 (500 psi) threshold to be passed.

EXAMPLE 1

Slurry base:
H class cement +35% BWOC of silica powder +1.5% BWOC of filtrate control agent Slurry density: 1.92 g/cm3 (16 lbm/gal). The thickening time (TT) and compressive strength (CS) development properties were studied.

In this example, the main initial criterion was to obtain good CS, and the other parameters were adjusted as a function of this criterion.

The test temperature were chosen from the range of temperatures considered as "high" in the oil industry, that is to say over 150° C. (300° F.).

The results are set out in Table I below.

It can be seen that:

tests 1 and 2 show an uncontrollable TT;

the only tests that enable very good CS at 24 hours to be obtained in an appropriate range of retarding mixture concentrations BWOC and a sufficiently broad range of temperatures are tests 6, 7, 8 and 9.

This example underlines the importance of selecting a Ph/B ratio close to 5/90 by weight in terms of the active materials.

EXAMPLE 2

In this example, the retarding mixture ("E"+ borax) was used in the preferred ratio of 5/90 (or 0.055) indicated by example 1.

Slurry base: as in example 1.

Slurry density: as in example 1.

In this example, emphasis was placed on trying to obtain a very long thickening time (TT).

The results are grouped together in Table II below.

This example shows that, in the BHCT range of 177 to 232° C. (350° to 450° F.) the retarding mixture according to the invention makes it possible to obtain remarkable CS for long, or very long thickening times.

Tests Nos 2 and 3 are very markedly preferred in practice as, at a BHCT of 232° C. (450° F.), they lead to TT>7 hours and to perfectly acceptable CS values both for static temperatures below and above circulation temperature.

EXAMPLE 3

In this example, we sought to extend the teachings of the preceding examples to both low density and high density slurries, or those containing high percentages of salt in the mixing water, through the addition of suitable additives.

Slurry base: as in example 1.

The retarding mixture was an E/borax mixture in the preferred ratio of 5/90 (0.055) by weight in terms of the active materials.

The results are grouped together in Table III below.

It can be seen that, for all the concentration, density and temperature ranges considered, the retarding mixture according to the invention led to a thickening time of approximately 7 hours or more, and to very swift compressive strength development.

EXAMPLE 4

In this example we sought to draw a comparison between the system according to the invention and known prior art systems.

The initial criteria were reasonably a long thickening time and, of course, high temperature.

The results are grouped together in Table IV below, in which the following agents were compared:

LS: lignosulfonate
B: borax
G: gluconate with the preferred system according to the invention, referenced "INV".

Slurry base and density were as in example 1.

Table IV confirms that only the E/B system according to the invention (in this example, with a ratio of 5/90 by weight in terms of the active materials) leads both to sufficient pumping times and to swift compressive strength development. It was noted in particular, that, for similar TT (4 to 6 hours), CS development was excessively delayed by the setting retarders of the prior art, which was not the case of the agent according to the invention, this being applicable whether the temperature was above or below the BHCT.

In the right-hand column, which corresponds to the most important criterion, as it represents the temperature conditions close to the surface, we note that the critical threshold of 45 kg/cm2 (500 psi) was reached in well under 1 day according to the invention, as opposed to 2 days or well over 2 days in the case of the prior art.

For the operator working in the field, this represents a different order of magnitude.

EXAMPLE 5

This example provides a comparison of the effect of shear stresses due to the pumping of the slurry on different retarding systems. The results are grouped together in Table V below.

This table shows that the LS/G/B system is suitable only in return for a very high concentration BWOC, the cost of which is prohibitive, and only at 205° C. (400° F. it would not be suitable at 300° F.).

Table IV has shown us, moreover, that the system only reaches an acceptable CS value at BHCT less 30° C. (50° F.) (that is to say precisely the sensitive temperature range close to the surface) after more than 50 hours.

The LS/G/B systems are thus absolutely unsuitable in practice.

The only system that is suitable is, according to Table V, the INV system according to the invention (E/B at 5/90 by weight in terms of the active materials), as, for a perfectly acceptable TT of 5 hours 38 minutes, the CS threshold is passed in less than 10 hours, with pre-conditioning, that is to say simulating as well as possible an actual cementing operation.

Pre-conditioning conditions temperature and pressure rise in 1 hour 15 minutes:

* Temperature T rising from ambient temperature to 205° C. (400° F.)

Pressure P rising from 13.8 MPa (2000 psi) to 151.7 MPa (22,000 psi)

maintaining T=205° C. and P=151.7 MPa with stirring for 1 hour cooling down to 90° C. (194° F.) in 45 minutes with stirring.

Residence in UCA cell

System static at 205° C. (400° F.) and 20.7 MPa (3000 psi).

TABLE 1

| Test No. | Retarding mixture in % BWOC | Ph/B ratio in % by weight* | BHCT °C. | BHCT °F. | TT h:min | ST °C. | ST °F. | CS at 24 h psi | CS at 24 h MPa | ST °C. | ST °F. | CS at 24 h psi | CS at 24 h MPa |
|---|---|---|---|---|---|---|---|---|---|---|---|---|---|
| 1 | 2.1 | 0.269(21/79) | 232 | 450 | 2:30 | | | — | | — | — | — | — |
| 2 | 2.2 | 0.269(21/79) | 232 | 450 | >7 h | | | — | | — | — | — | — |
| 3 | 1.5 | 0.166(14/86) | 177 | 350 | 3:50 | 197 | 386 | 5492 | (37.9) | 160 | 320 | 2808 | (19.4) |
| 4 | 2.1 | 0.166(14/86) | 205 | 400 | 3:13 | 220 | 428 | 873 | (6.0) | 188 | 370 | No strength | |
| 5 | 2.8 | 0.088(8/92) | 232 | 450 | 3:35 | 260 | 500 | 4370 | (30.1) | 216 | 420 | 350 | (2.4) |
| 6 | 1.3 | 0.055(5.26/94.74) | 149 | 300 | 3:26 | 177 | 350 | 8340 | (57.5) | 132 | 270 | 4900 | (33.8) |
| 7 | 1.7 | 0.055(5.26/94.74) | 177 | 350 | 3:45 | 197 | 386 | 8900 | (61.4) | 160 | 320 | 2600 | (17.9) |
| 8 | 2.4 | 0.055(5.26/94.74) | 205 | 400 | 3:20 | 232 | 450 | 5280 | (36.4) | 188 | 370 | 7119 | (49.1) |
| 9 | 3.2 | 0.055(5.26/94.74) | 232 | 450 | 4:14 | 260 | 500 | 3729 | (25.7) | 216 | 420 | 5988 | (41.3) |

*and in terms of the active materials

TABLE II

| Test No. | Retarding mixture in % BWOC | BHCT °C. | BHCT °F. | ST h:min | ST °C. | ST °F. | CS at 24 h psi | CS at 24 h MPa |
|---|---|---|---|---|---|---|---|---|
| 1 | 3.2 | 232 | 450 | 4:15 | 260 | 500 | 3729 | (25.7) |
| | | | | | 216 | 420 | 5988 | (41.3) |
| 2 | 3.5 | 232 | 450 | >7 h | 260 | 500 | 4900 | (33.8) |
| | | | | | 216 | 420 | 4800 | (33.1) |
| 3 | 3.9 | 232 | 450 | >7 h | 260 | 500 | 3840 | (26.5) |
| | | | | | 216 | 420 | 3120 | (21.5) |
| 4 | 2.4 | 205 | 400 | 3:20 | 232 | 450 | 5280 | (36.4) |
| | | | | | 188 | 370 | 7119 | (49.1) |
| 5 | 2.9 | 205 | 400 | 5:30 | 188 | 370 | 6400 | (44.1) |
| 6 | 1.7 | 177 | 350 | 3:45 | 197 | 386 | 8900 | (61.4) |
| 7 | 2.0 | 177 | 350 | 5:30 | 205 | 400 | 7745 | (53.4) |
| | | | | | 149 | 300 | 500 in 19h27 | |
| 8 | 1.3 | 149 | 300 | 3:26 | 177 | 350 | 8340 | (57.5) |
| | | | | | 132 | 270 | 4900 | (33.8) |
| 9 | 1.5 | 149 | 300 | 6:08 | 121 | 250 | 500 | (3.4) |
| | | | | | | | in 26h31 | |

TABLE III

| Test No. | Slurry density in g/cm3 (ppg) | Retarding mixture in % BWOC | BHCT °C. | BHCT °F. | TT h:min | ST °C. | ST °F. | CS at 24 h psi | CS at 24 h MPa |
|---|---|---|---|---|---|---|---|---|---|
| 1 | 1,68 (14) (+ 4% bentonite BWOC) | 2.2 | 177 | 350 | >7 h | 160 | 320 | 1775 | (12.2) |
| 2 | 1,68 (14 (+ 2% bentonite BWOC) | 2.6 | 205 | 400 | >7 h | 188 | 370 | 2250 | (15.5) |
| 3 | 2,28 (19) 100% weighting agent BWOC) | 3.7 | 192 | 378 | 6:18 | 210 | 410 | 4610 | (31.8) |
|   |   |   |   |   |   | 176 | 348 | 4030 | (27.8) |
| 4 | 1,92 (16) (+ 30% salt BWOW) | 3.2 | 205 | 400 | >7 h | 188 | 370 | 2716 | (18.7) |
| 5 | 1,92 (16) (+ 37% salt BWOW) | 3.1 | 205 | 400 | >7 h | 188 | 370 | 2290 | (15.8) |

TABLE IV

| TEST | BHCT °C. | BHCT °F. | BHST °C. | BHST °F. | Retarding agent | % agent BWOC | TT h:min | PV (cP) | Rheology Ty (lbf/100 Pa | Rheology ft2 | Filtrate in ml/30 min |
|---|---|---|---|---|---|---|---|---|---|---|---|
| 1 |   | 350 |   | 197 | 386 | LS/B | 3.0 | 6:00 | 541 | 4.6 | 9.7 | 285 |
| 2 |   | 400 |   | 232 | 450 | LS/B | 4.5 | 6:00 | 451 | 12.0 | 25.0 | 40 |
| 3 |   | 350 |   | 197 | 386 | LS/G | 3.0 | 6:15 | 565 | 6.7 | 14.0 | 40 |
| 4 |   | 400 |   | 232 | 450 | LS/G/B | 6.0 | 5:34 | 561 | 5.8 | 12.2 | 128 |
| 5 |   | 350 |   | 197 | 386 | IMP | 1.7 | 3:40 | 364 | 3.1 | 6.4 | 26 |
| 6 |   | 350 |   | 197 | 386 | IMP | 2.0 | 5:30 | 378 | 3.8 | 7.9 | 40 |
| 7 |   | 400 |   | 232 | 450 | IMP | 2.8 | 5:38 | 596 | 5.2 | 10.9 | 34 |
| 8 |   | 450 |   | 260 | 500 | IMP | 3.2 | 4:23 | 435 | 6.8 | 14.3 | 62 |

| TEST | CS at BHST psi | CS at BHST (MPa) | CS at BHST in h:min | CS at BHCT psi | CS at BHCT (MPa) | CS at BHCT in h:min | CS at BHCT - 50° F. (30° C.) psi | CS at BHCT - 50° F. (30° C.) MPa | CS at BHCT - 50° F. (30° C.) in h:min |
|---|---|---|---|---|---|---|---|---|---|
| 1 | 7450 | ( ) | 24:00 | 50 | ( ) | 18:23 | 50 | ( ) | 40:42 |
|   |   |   |   | 500 | ( ) | 22:32 | 500 | ( ) | 45:53 |
| 2 | 155 | ( ) | 24:00 | 50 | ( ) | 21:12 | 50 | ( ) | 50:54 |
|   |   |   |   | 500 | ( ) | 23:01 | 500 | ( ) | 59:19 |
| 3 | 50 | ( ) | 8:19 | 50 | ( ) | 14:00 | 50 | ( ) | 43:55 |
|   | 500 | ( ) | 9:25 | 500 | ( ) | 15:51 | 500 | ( ) | 51:04 |
| 4 | 4130 | ( ) | 24:00 | 50 | ( ) | 11:15 | 50 | ( ) | 45:56 |
|   |   |   |   | 500 | ( ) | 12:04 | 500 | ( ) | 50:45 |
| 5 | 8910 | ( ) | 24:00 | 50 | ( ) | 5:24 | 50 | ( ) | 10:52 |
|   |   |   |   | 500 | ( ) | 6:50 | 500 | ( ) | 13:00 |
| 6 | 7745 | ( ) | 24:00 | 50 | ( ) | 6:37 | 50 | ( ) | 15:29 |
|   |   |   |   | 500 | ( ) | 8:16 | 500 | ( ) | 19:27 |
| 7 | 4230 | ( ) | 24:00 | 50 | ( ) | 6:28 | 50 | ( ) | 11:11 |
|   |   |   |   | 500 | ( ) | 7:07 | 500 | ( ) | 13:13 |
| 8 | 2980 | ( ) | 24:00 | 4880 | ( ) | 24:00 | 50 | ( ) | 8:58 |
|   |   |   |   |   |   |   | 500 | ( ) | 9:55 |

TABLE V

| TEST | Retarding agent | % BWOC | Test temperature °C. | Test temperature °F. | TT h:min | CS without P-C psi | CS without P-C MPa | time h:min | CS with 3 h P-C psi | CS with 3 h P-C MPa | temps h:mn |
|---|---|---|---|---|---|---|---|---|---|---|---|
| 1 | LS/G/B | 3.0 | 205 | 400 | 1:30 | — |   |   |   |   |   |
| 2 | LS/G/B | 6.0 | 205 | 400 | 5:34 | 50 |   | 11:15 | 50 |   | 16:04* |
|   |   | 4.5 |   |   |   | 500 |   | 12:04 | 500 |   | 17:17 |
| 3 | LS/B | 2.8 | 205 | 400 | 6:00 | 50 |   | 21:12 | not set in |   |   |

TABLE V-continued

| TEST | Retarding agent | % BWOC | Test °C. | temperature °F. | TT h:min | CS without P-C | | | CS with 3 h P-C | | |
|---|---|---|---|---|---|---|---|---|---|---|---|
| | | | | | | psi | MPa | time h:min | psi | MPa | temps h:mn |
| 4 | IMP(*) | | 205 | 400 | 5:38 | 500 50 500 | | 23:01 6:08 7:07 | 4 days 50 500 | | 8:51 9:27 |

*3 hours of P-C and 13 hours 04 minutes in UCA cell
*P-C means "pre-conditioning", as defined in the description.

We claim:

1. An oilfield cementing composition comprising a cementitious material and a set-retarding blend consisting essentially of first and second retarding additives in a weight ratio of the second retarding additive to the first retarding additive ranging from about 0.025 to about 0.2 wherein the first retarding additive comprises borax and the second retarding additive is selected from a group consisting of: the calcium salt of ethylenediamine N,N,N',N' tetrakis-(methylene) phosphonic acid, the heptasodic salt of ethylenediamine N,N,N',N'tetrakis-(methylene) phosphonic acid, ethylenediamine N,N,N',N",N" penta-(methylene) phosphonic acid and combinations thereof.

2. The cementing composition as set forth in claim 1 wherein the selected second retarding additive is the calcium salt of ethylenediamine N,N,N',N' tetrakis-(methylene) phosphonic acid.

3. The cementing composition as set forth in claim 1 wherein the weight ratio of the second retarding additive to the first retarding additive is 0.055.

4. The cementing composition as set forth in claim 2 wherein the weight ratio of the second retarding additive to the first retarding additive is 0.055.

5. The cementing composition as set forth in claim 1 wherein the retarding composition comprises from about 0.1 to about 10 percent by weight of the cementitious material.

* * * * *